(12) United States Patent
Takigawa

(10) Patent No.: US 12,500,670 B2
(45) Date of Patent: Dec. 16, 2025

(54) SUBMARINE OPTICAL CABLE SYSTEM

(71) Applicant: NEC Corporation, Tokyo (JP)

(72) Inventor: Yoshinari Takigawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 184 days.

(21) Appl. No.: 18/021,352

(22) PCT Filed: Jul. 2, 2021

(86) PCT No.: PCT/JP2021/025178
§ 371 (c)(1),
(2) Date: Feb. 14, 2023

(87) PCT Pub. No.: WO2022/044545
PCT Pub. Date: Mar. 3, 2022

(65) Prior Publication Data
US 2023/0308186 A1  Sep. 28, 2023

(30) Foreign Application Priority Data
Aug. 25, 2020 (JP) .................. 2020-141351

(51) Int. Cl.
*H04B 10/25* (2013.01)
*H04B 10/032* (2013.01)
(Continued)

(52) U.S. Cl.
CPC ............. *H04B 10/27* (2013.01); *H04B 10/25* (2013.01); *H04Q 11/0005* (2013.01);
(Continued)

(58) Field of Classification Search
CPC ...... H04B 10/27; H04B 10/25; H04B 10/032; H04Q 11/0005; H04Q 2011/0037;
(Continued)

(56) References Cited

U.S. PATENT DOCUMENTS 5,214,312 A * 5/1993 Inoue .................. H04B 3/44
307/112
5,526,157 A * 6/1996 Kawano .............. H04B 10/032
398/1
(Continued)

FOREIGN PATENT DOCUMENTS

CN 106357000 A 1/2017
CN 107005269 A 8/2017
(Continued)

OTHER PUBLICATIONS

International Search Report for PCT Application No. PCT/JP2021/025178, mailed on Oct. 5, 2021.
(Continued)

*Primary Examiner* — Jai M Lee

(57) ABSTRACT

In order to improve the flexibilities of structures to be added, a submarine optical cable system according to the present invention comprises a first switching device connected to a first land station by means of a first submarine optical cable, a second switching device connected to a second land station by means of a second submarine optical cable, and a third submarine optical cable connected to the first switching device and to the second switching device, wherein the first switching device comprises a first optical fiber core connecting unit and a first optical switch group, and the second switching device comprises a second optical fiber core connecting unit and a second optical switch group.

19 Claims, 15 Drawing Sheets

(51) Int. Cl.
*H04B 10/27* (2013.01)
*H04Q 11/00* (2006.01)

(52) U.S. Cl.
CPC .... *H04B 10/032* (2013.01); *H04Q 2011/0037* (2013.01); *H04Q 2011/0052* (2013.01)

(58) Field of Classification Search
CPC ... H04Q 2011/0052; H04Q 2011/0039; H04Q 2011/0043
USPC .......................................................... 398/45
See application file for complete search history.

(56) References Cited

U.S. PATENT DOCUMENTS

| | | | | |
|---|---|---|---|---|
| 5,719,693 | A * | 2/1998 | Tanoue | H04B 10/29 398/178 |
| 5,884,017 | A * | 3/1999 | Fee | H04Q 3/0079 398/5 |
| 6,377,373 | B1 * | 4/2002 | Kawazawa | H04B 10/27 398/82 |
| 6,895,187 | B1 * | 5/2005 | Webb | H04Q 11/0005 398/104 |
| 7,848,642 | B1 * | 12/2010 | Chaudhuri | H04J 14/0284 398/4 |
| 9,258,215 | B2 * | 2/2016 | Hussain | H04Q 11/0066 |
| 9,660,457 | B2 * | 5/2017 | Takigawa | H04B 10/25 |
| 10,263,712 | B2 * | 4/2019 | Desbruslais | H04B 10/808 |
| 10,536,236 | B2 * | 1/2020 | Younce | H04J 14/02122 |
| 10,707,957 | B2 * | 7/2020 | Frisch | H04Q 11/0062 |
| 10,805,034 | B2 * | 10/2020 | Chimfwembe | H04B 10/032 |
| 11,165,529 | B2 * | 11/2021 | Yamamoto | H04Q 11/0005 |
| 11,556,096 | B2 * | 1/2023 | Takigawa | H04B 3/44 |
| 11,945,561 | B2 * | 4/2024 | Coughlan | B60L 53/305 |
| 11,994,728 | B2 * | 5/2024 | Takigawa | G02B 6/4427 |
| 2003/0031433 | A1 | 2/2003 | Feinberg | |
| 2013/0039643 | A1 * | 2/2013 | Tokura | H04J 14/0297 398/79 |
| 2014/0103739 | A1 * | 4/2014 | Takigawa | H04B 3/44 307/112 |
| 2017/0331516 | A1 | 11/2017 | Yamaguchi | |
| 2024/0039267 | A1 * | 2/2024 | Garrett | H02G 1/10 |

FOREIGN PATENT DOCUMENTS

| | | | |
|---|---|---|---|
| CN | 108604934 A | 9/2018 | |
| CN | 110383717 A | 10/2019 | |
| CN | 111466089 A | 7/2020 | |
| EP | 1202595 A1 * | 5/2002 | .......... H04J 14/0212 |
| EP | 2002500778 A * | 5/2002 | .......... H04Q 11/0062 |
| EP | 2709284 A1 | 3/2014 | |
| EP | 3232578 A1 | 10/2017 | |
| JP | H04-137828 A | 5/1992 | |
| JP | H07-087013 A | 3/1995 | |
| JP | H11-041174 A | 2/1999 | |
| JP | 2000-503182 A | 3/2000 | |
| JP | 2016-111480 A | 6/2016 | |
| JP | 2019-501586 A | 1/2019 | |
| WO | 2016/092806 A1 | 6/2016 | |
| WO | 2016/147610 A1 | 9/2016 | |
| WO | WO-2017074653 A1 * | 5/2017 | .......... H04J 14/0212 |

OTHER PUBLICATIONS

English translation of Written opinion for PCT Application No. PCT/JP2021/025178, mailed on Oct. 5, 2021.
Extended European Search Report for EP Application No. 21860975.8, dated on Feb. 8, 2024.
CN Office Action for CN Application No. 202180052162.8, mailed on Mar. 14, 2025 with English Translation.
CN Office Communication for CN Application No. 202180052162.8, mailed on Jul. 28, 2025 with English Translation.

* cited by examiner

Fig.3A
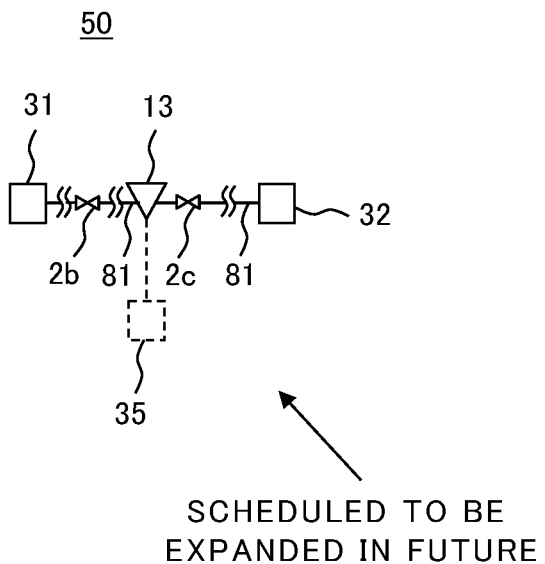
SCHEDULED TO BE EXPANDED IN FUTURE
Fig.3B  BRANCH DEVICE 13 USING ONE-BY-TWO SWITCH
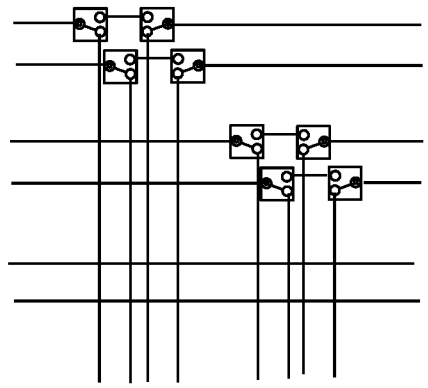
Fig.3C  BRANCH DEVICE 13 USING TWO-BY-TWO SWITCH
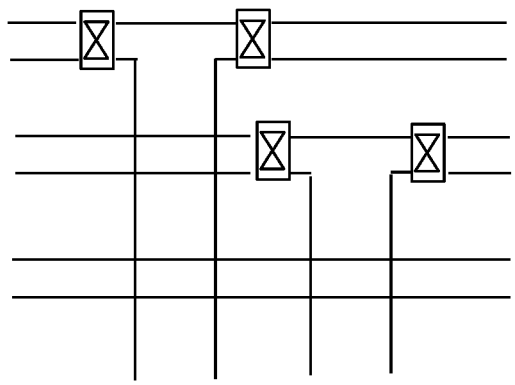

Fig. 9 SUBMARINE OPTICAL CABLE SYSTEM 50

SUBMARINE OPTICAL CABLE SYSTEM

This application is a National Stage Entry of PCT/JP2021/025178 filed on Jul. 2, 2021, which claims priority from Japanese Patent Application 2020-141351 filed on Aug. 25, 2020, the contents of all of which are incorporated herein by reference, in their entirety.

TECHNICAL FIELD

The present invention relates to communication via a submarine optical cable.

BACKGROUND ART

A submarine optical cable system that establishes optical communication between land stations has been widely used for inter-continental and large-capacity communication or the like.

FIG. 1 is a conceptual diagram illustrating a configuration of a submarine optical cable system 50 being an example of a general submarine optical cable system. The submarine optical cable system 50 includes land stations 31 to 34, relay amplification devices 2a to 2f, branch devices 11 and 12, and submarine optical cables 81 to 83.

The submarine optical cables 81 to 83 are submarine optical cables that are installed mainly on the seabed or in the sea water. The submarine optical cables 81 to 83 each include an optical fiber pair and a power supply wire. Herein, the optical fiber pair is a pair of optical fiber cores through which optical signals advance in directions opposite to each other. Further, the power supply wire is a lead wire for supplying power to the branch device, the relay amplification device, and the like that are connected to the submarine optical cable.

The land stations 31 to 34 are installed on the land, and each transmit an optical signal to another land station and receive an optical signal to be transmitted from another land station. Each of the land stations 31 to 34 further supplies power to the power supply wire included in the connected submarine optical cable.

The relay amplification devices 2a to 2f each optically amplify optical signals in both directions that are transmitted via the optical fiber pair included in the inserted submarine optical cable. The relay amplification devices 2a to 2f are installed on the seabed or in the sea water. Those matters are similar with regard to other relay amplification devices to be described later as well.

The branch devices 11 and 12 are installed on the seabed or in the sea water. Those matters are similar with regard to other branch devices to be described later as well. The branch device 11 connects the submarine optical cable 81 and the submarine optical cable 82 to each other. The connection includes connection of the optical fiber pair included in the submarine optical cable 81 to the optical fiber pair included in the submarine optical cable 82, and connection of the power supply wire included in the submarine optical cable 81 to the power supply wire included in the submarine optical cable 82.

The branch device 12 connects the submarine optical cable 81 and the submarine optical cable 83 to each other. The connection includes connection (branching) of the optical fiber pair included in the submarine optical cable 81 to the optical fiber pair included in the submarine optical cable 83, and connection (branching) of the power supply wire included in the submarine optical cable 81 to the power supply wire included in the submarine optical cable 83.

With the configuration described above, the submarine optical cable system 50 enables optical communication among the land stations 31 to 34.

In actuality, the branch devices 11 and 12 are each an optical connection switching device that switches connection between the optical fiber cores, and such an optical connection switching device is generally referred to as a branch device. Therefore, also in description given below, such an optical connection switching device is also referred to as a branch device in some cases.

FIG. 2 is a conceptual diagram illustrating a state in which a failure occurs in the submarine optical cable system 50 in FIG. 1. Due to a failure at a position A, a communication path between the branch device 11 and the branch device 12 cannot be used. Thus, optical communication with a huge amount of traffic cannot be established between the land station 31 and the land station 32. This situation continues until recovery from the failure of the submarine optical cable 81. In this manner, when a failure occurs in the submarine optical cable, optical communication via the submarine optical cable cannot be established until recovery is made by replacing the submarine optical cable or the like.

Herein, PTL 1 discloses an optical cable system including a redundancy optical cable that has one end connected to an optical branch device and has first and second elongated branch optical fiber pairs being built-in.

Further, PTL 2 discloses a branch device that includes a standby circuit system, includes a cable branched into a plurality of directions, and is capable of performing switching from an active system having a failure to the standby circuit system when the failure occurs.

CITATION LIST

Patent Literature

[PTL 1] Japanese Unexamined Patent Application Publication No. H07-087013
[PTL 2] Japanese Unexamined Patent Application Publication No. H04-137828

SUMMARY OF INVENTION

Technical Problem

A general submarine optical cable system has a problem that arises when facilities for optically communicating with other land stations are scheduled to be additionally installed in the future. This is because, when a branch device, a submarine optical cable, and the like are scheduled to be additionally installed in the future for connection with other land stations, a configuration of the facilities to be additionally installed is required to be determined from the beginning.

For example, as illustrated in FIG. 3A, it is assumed that a configuration to be connected with a land station 35 is scheduled to be additionally installed in the submarine optical cable system 50 in the future. In the submarine optical cable system 50 in FIG. 3A, the relay amplification devices 2a, 2d, 2e, and 2f, the branch devices 11 and 12, the land stations 33 and 34, and the submarine optical cables 82 and 83 in FIG. 1 are not illustrated.

In this case, a branch device 13 is required to be installed in advance before additional installation. This is because, in order to perform additional installation afterward, huge-traffic optical communication is required to be stopped between the land stations 31 and 32 during an additional installation period. Such stoppage cannot be performed in actuality. Thus, for example, when the branch device 13 is configured by a one-by-two switch as illustrated in FIG. 3B, it is impossible in actuality to change the configuration to a two-by-two switch as illustrated in FIG. 3C. Thus, there is a limitation also to a degree of flexibility in selecting which optical fiber core included in the submarine optical cable 81 is to be connected to an optical fiber core included in a submarine optical cable for establishing connection with the land station 35.

An object of the present invention is to provide a submarine optical cable system and the like that improve a degree of flexibility of a configuration to be additionally installed.

Solution to Problem

A submarine optical cable system according to the present invention includes a first switching device being connected to a first land station via a first submarine optical cable, a second switching device being connected to a second land station via a second submarine optical cable, and a third submarine optical cable being connected to the first switching device and the second switching device, wherein the first switching device includes a first optical fiber core connecting unit to which an optical fiber core of a submarine optical cable equivalent to the third submarine optical cable is allowed to be connected, and a first optical switch group that switches a connection destination of an optical fiber core included in the first submarine optical cable to any one of an optical fiber core included in the third submarine optical cable and the first optical fiber core connecting unit, based on first optical connection switching information being transmitted, and the second switching device includes a second optical fiber core connecting unit to which an optical fiber core of a submarine optical cable equivalent to the third submarine optical cable is allowed to be connected, and a second optical switch group that switches a connection destination of an optical fiber core included in the second submarine optical cable to any one of an optical fiber core included in the third submarine optical cable and the second optical fiber core connecting unit, based on second optical connection switching information being transmitted.

Advantageous Effects of Invention

The submarine optical cable system and the like according to the present invention improve a degree of flexibility of a configuration to be additionally installed.

BRIEF DESCRIPTION OF DRAWINGS

FIG. 3A is a conceptual diagram illustrating an example in which additional installation is enabled in the general submarine optical cable system.

FIG. 3B is a block diagram illustrating a branch device using one-by-two switches.

FIG. 3C is a block diagram illustrating a branch device using two-by-two switches.

EXAMPLE EMBODIMENT

Figure 1:
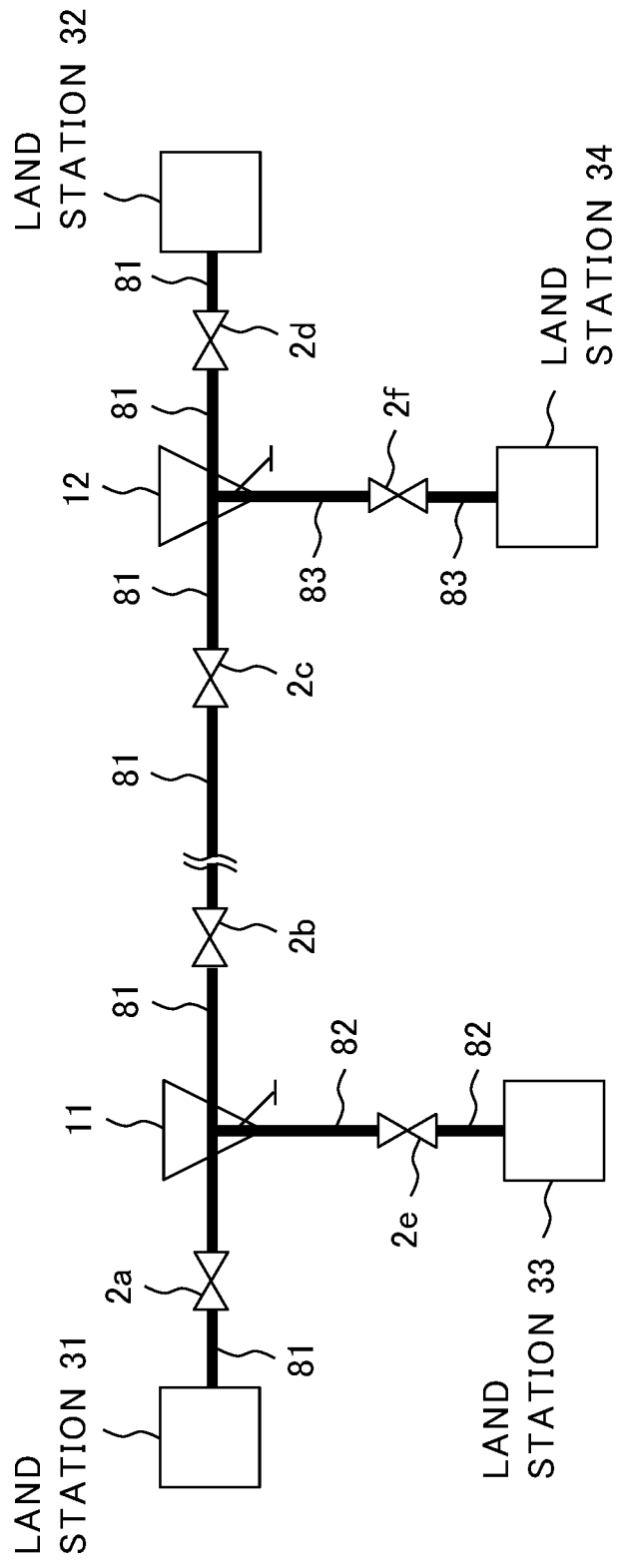
FIG. 1 is a conceptual diagram illustrating a configuration example of a general submarine optical cable system.
Figure 2:
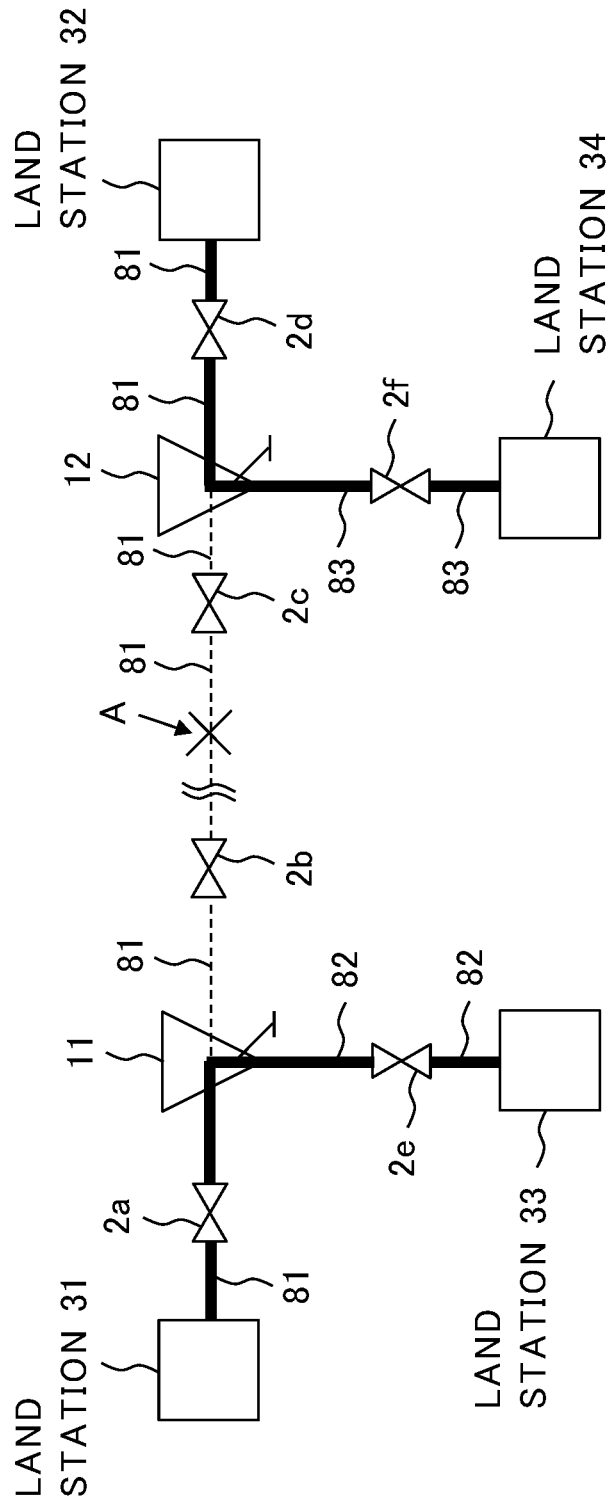
FIG. 2 is a conceptual diagram illustrating a state in which a failure occurs in the general submarine optical cable system.
Figure 4:
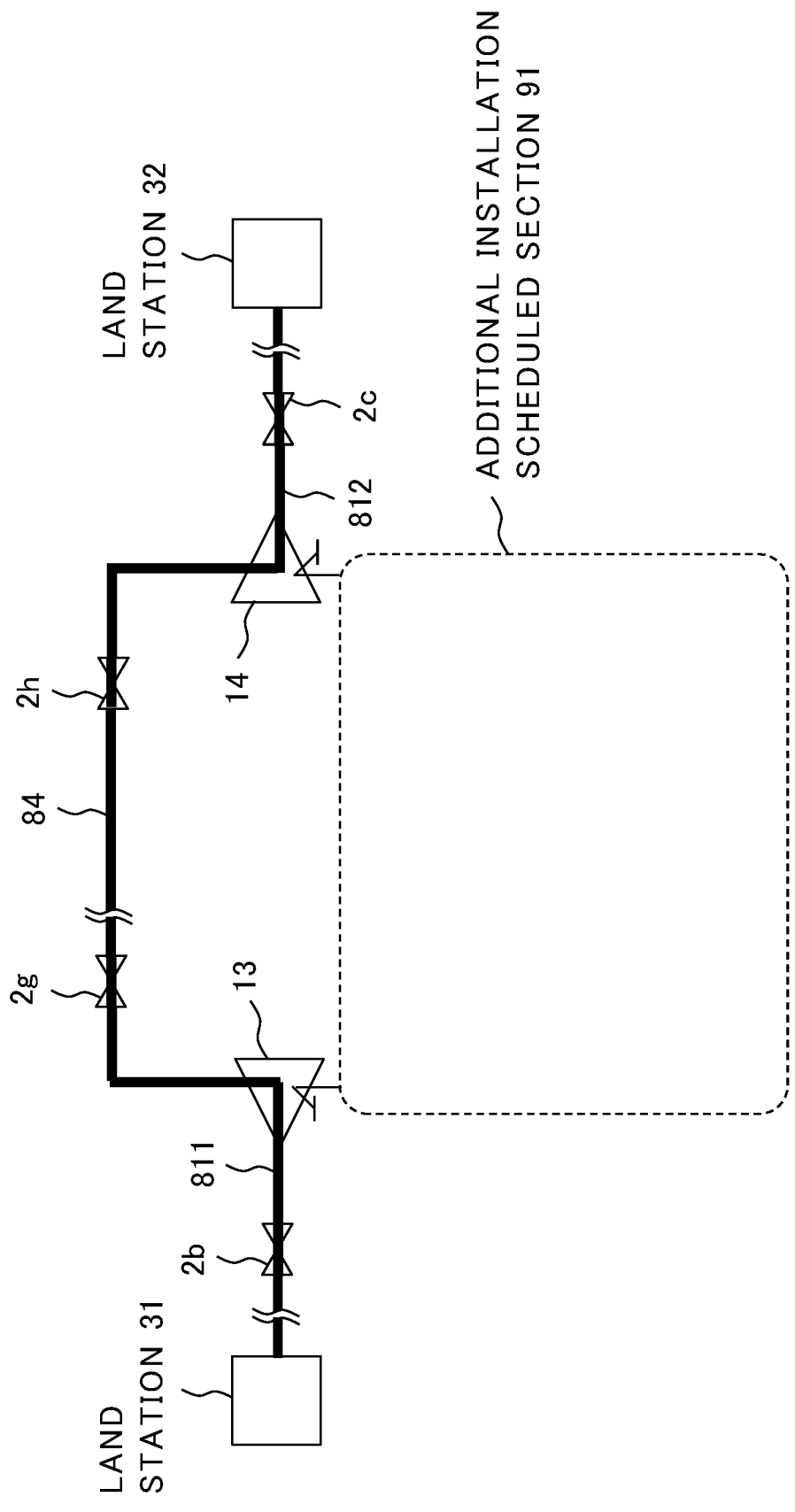
FIG. 4 is a conceptual diagram illustrating a configuration example of a submarine optical cable system according to the present example embodiment.

FIG. 4 is a conceptual diagram illustrating a configuration of a submarine optical cable system 50 being an example of a submarine optical cable system according to the present example embodiment. An additional installation scheduled section 91 is a section in which additional installation is scheduled.

In the submarine optical cable system 50 in FIG. 4, a branch device 13 is connected to a submarine optical cable 811, and a branch device 14 is connected to a submarine optical cable 812. The branch device 13 and the branch device 14 are connected to each other via a submarine optical cable 84. The connection therebetween involves optical connection using optical fiber pairs and electrical connection using power supply wires. Herein, the optical fiber pair is a pair of optical fiber cores through which optical signals advance in directions opposite to each other. The number of optical fiber pairs included in the submarine optical cable 84 is, for example, equal to the number of optical fiber pairs included in the submarine optical cable 811 or 812.

The branch device 13 causes optical signals that are transmitted from the land station 31 via the optical fiber pairs of the submarine optical cable 811, to enter the optical fiber pairs included in the submarine optical cable 84. Note that, when the additional installation scheduled section 91 is additionally installed, the branch device 13 is also capable of distributing the optical signals to optical fiber pairs included in a submarine optical cable included in the additionally installed section.

The branch device 13 further causes optical signals that are transmitted from the land station 32 via the optical fiber pairs of the submarine optical cable 84, to enter the optical fiber pairs included in the submarine optical cable 811. Note that, when the additional installation scheduled section 91 is additionally installed, the branch device 13 is also capable of causing the optical signals that are transmitted from the optical fiber pairs included in the submarine optical cable included in the additionally installed section, to enter the optical fiber pair of the submarine optical cable 811.

The branch device 13 includes an optical switch that performs switching the entry of optical signals described above. For example, the optical switch performs switching of the optical fiber core being a connection destination, based on optical connection switching information that is transmitted from the land station 31 via the optical fiber cores of the submarine optical cable 811. The optical connection information described above may be transmitted from the land station 32 via the optical fiber cores of the submarine optical cable 84.

The branch device 13 further connects the power supply wire included in the submarine optical cable 811 to the power supply wire included in the submarine optical cable 84. Note that, when the additional installation scheduled section 91 is additionally installed, the branch device 13 is also capable of connecting the power supply wire of the submarine optical cable 811 to the power supply wire included in the submarine optical cable included in the additionally installed section.

The branch device 13 includes a connection switching unit (electrical switch) for performing such connection switching. For example, the connection switching unit performs switching of the power supply wire being a connection destination, based on power supply switching information that is transmitted from the land station 31 via the optical fiber cores of the submarine optical cable 811. The power supply switching information may be transmitted from the land station 32 via the optical fiber core of the submarine optical cable 84.

The branch device 14 has a configuration similar to the branch device 13, and performs similar operations.

In other words, the branch device 14 causes optical signals that are transmitted from the land station 32 vis the optical fiber pairs of the submarine optical cable 812, to enter the optical fiber pairs included in the submarine optical cable 84. Note that, when the additional installation scheduled section 91 is additionally installed, the branch device 14 is also capable of distributing the optical signals that are transmitted from the land station 32 via the optical fiber pairs of the submarine optical cable 812, to the optical fiber pairs included in the submarine optical cable included in the additionally installed section.

The branch device 14 further causes optical signals that are transmitted from the land station 31 via the optical fiber pair of the submarine optical cable 84, to enter the optical fiber pair included in the submarine optical cable 812. Note that, when the additional installation scheduled section 91 is additionally installed, the branch device 14 is also capable of causing the optical signals that are transmitted via the optical fiber pair included in the submarine optical cable included in the additionally installed section, to enter the optical fiber pair of the submarine optical cable 812.

The branch device 14 includes an optical switch that performs switching of the optical signals described above. For example, the optical switch performs switching of the optical fiber core being a connection destination, based on optical connection switching information that is transmitted from the land station 32 via the optical fiber cores of the submarine optical cable 812. The optical connection switching information may be transmitted from the land station 31 via the optical fiber cores of the submarine optical cable 84.

The branch device 14 further connects the power supply wire included in the submarine optical cable 812 to the power supply wire included in the submarine optical cable 84. Note that, when the additional installation scheduled section 91 is additionally installed, the branch device 14 is also capable of connecting the power supply wire of the submarine optical cable 812 to a power supply wire included in the submarine optical cable included in the additionally installed section.

The branch device 14 includes a connection switching unit (electrical switch) for performing such connection switching. For example, the connection switching unit performs switching of the power supply wire being a connection destination, based on power supply switching information that is transmitted from the land station 32 via the optical fiber cores of the submarine optical cable 812. Alternatively, the power supply switching information may be transmitted from the land station 31 via the optical fiber cores of the submarine optical cable 84.

Figure 5:
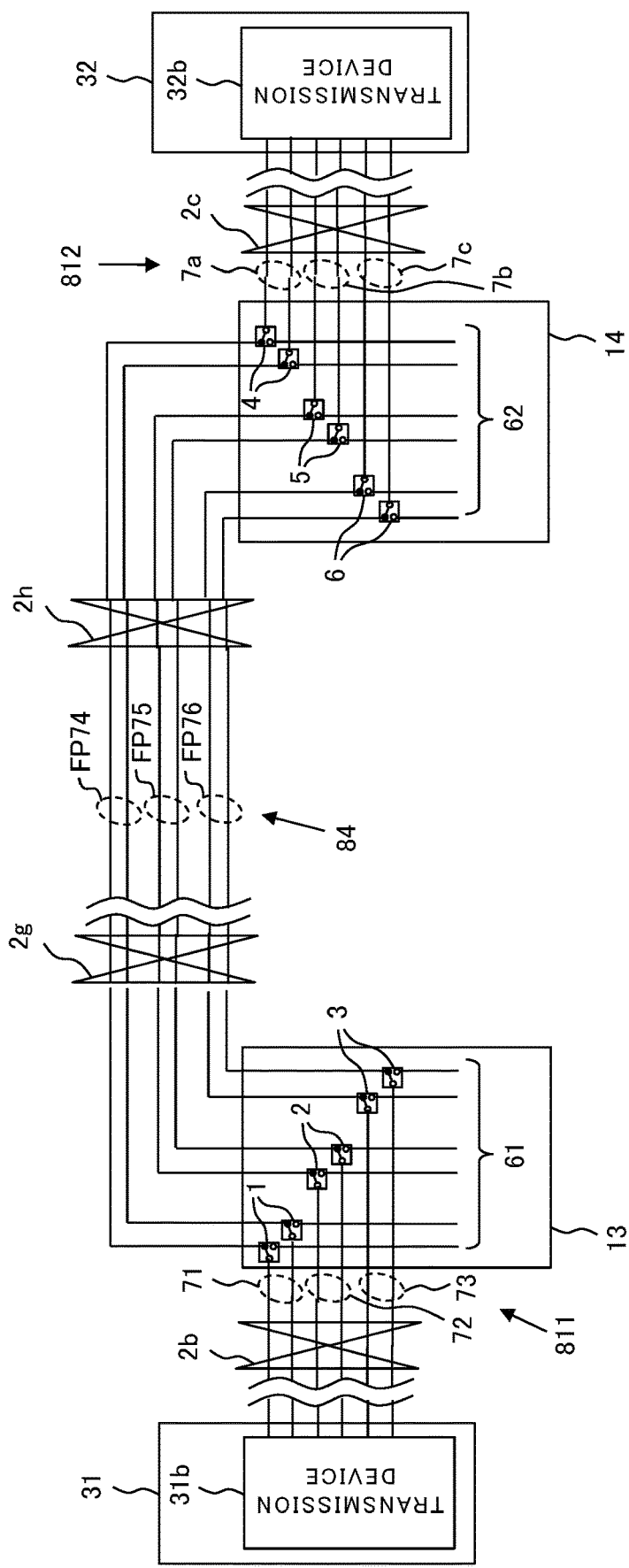
FIG. 5 is a conceptual diagram illustrating an example of a section relating to transmission of an optical signal in the submarine optical cable system according to the present example embodiment.
Figure 6:
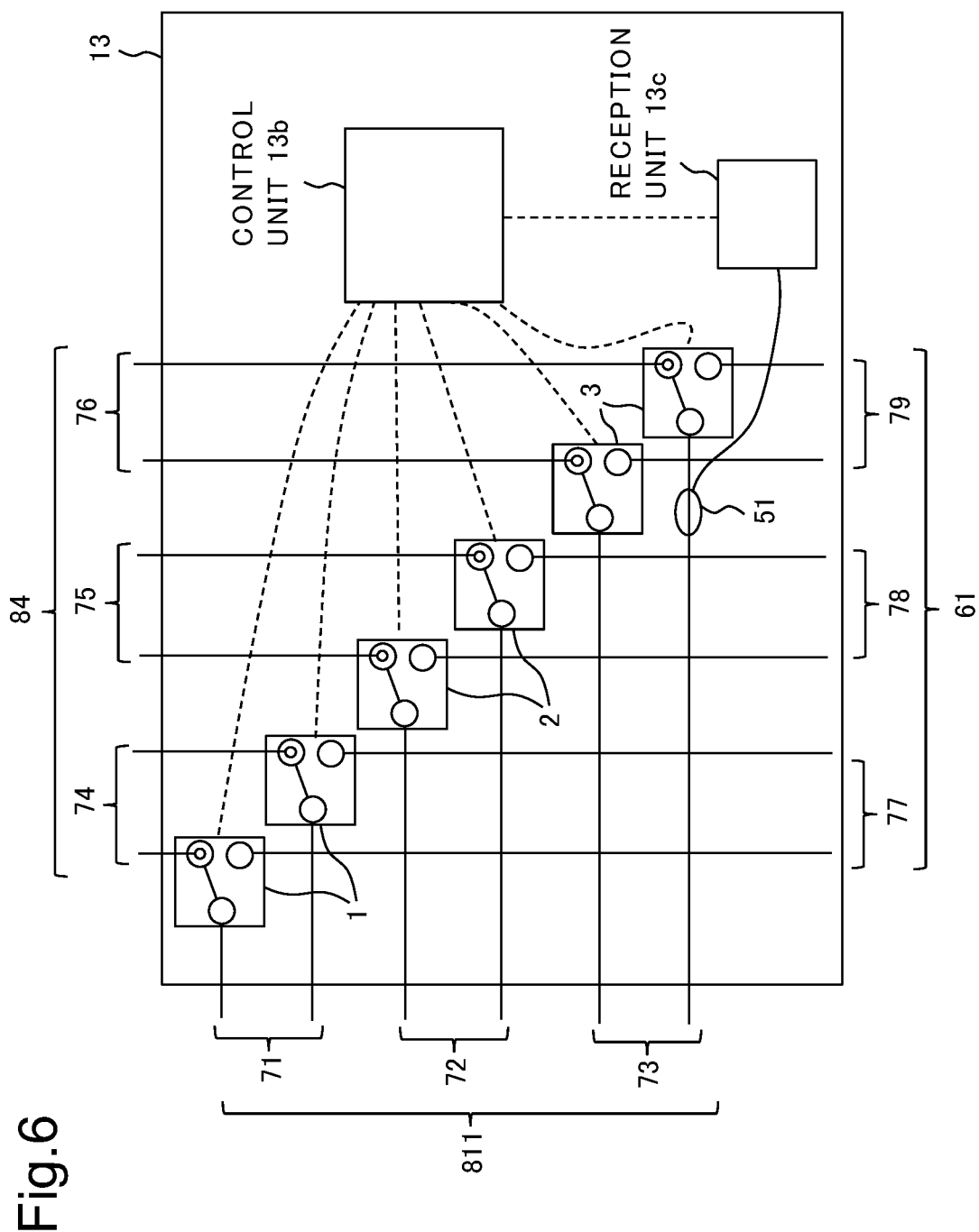
FIG. 6 is a conceptual diagram illustrating a configuration example of a branch device according to the present example embodiment.

FIG. 5 is a conceptual diagram illustrating a configuration example of a section relating to transmission of an optical signal in the submarine optical cable system 50 in FIG. 4. Further, FIG. 6 is a conceptual diagram illustrating a configuration example of the branch device 13 in FIG. 5.

The land stations 31 and 32 include transmission devices 31*b* and 32*b*. The submarine optical cable 811 includes optical fiber pairs 71 to 73. The submarine optical cable 812 includes optical fiber pairs 7*a* to 7*c*. The submarine optical cable 84 includes optical fiber pairs 74 to 76.

The branch device 13 includes optical switch pairs 1 to 3, a reception unit 13*c*, and a control unit 13*b*. To the reception unit 13*c*, an optical signal that is extracted by a coupler 51 from a lower optical fiber core of the optical fiber pair 73. The optical signal is an optical signal that is transmitted from the transmission device 31*b* in FIG. 5 to the transmission device 32*b*, and a control signal destined for the branch device 13 may be superimposed with the optical signal in some cases.

The reception unit 13*c* receives control information destined for the branch device 13, and transmits the received signal to the control unit 13*b*. When the control signal contains the optical connection switching information for switching the connection destination of the optical switch pairs 1 to 3, the control unit 13*b* follows the optical connection switching information. In other words, the control unit 13*b* follows the optical connection switching information, and causes each of the optical switch pairs 1 to 3 to switch a connection destination of each of the optical fiber pairs 71 to 73 to each of the optical fiber pairs 74 to 74 or each of the optical fiber pairs 77 to 79. The optical fiber pairs 77 to 79 are optical fiber pairs constituting an optical fiber pair group 61.

The branch device 14 in FIG. 5 is also similar thereto.

Note that, in FIGS. 5 and 6, for convenience of the explanation, the number of optical fiber pairs included in one submarine optical cable is three pairs, and the number of optical fiber pairs included in one submarine optical cable is freely selected. In general, the number of optical fiber pairs included in one submarine optical cable is four or more pairs.

In the submarine optical cable system 50 in FIGS. 5 and 6, the optical switch pairs 1 to 3 of the branch device 13 connect the optical fiber pairs 71 to 73 to the optical fiber pairs 74 to 76. Further, an end of each optical fiber pair in the optical fiber pair group 61 including optical fiber pairs that are not connected to any of the optical fiber pairs 71 to 73 and the optical fiber pairs 74 to 76 is opened. When additional installation is performed afterward, the optical fiber pair group 61 is drawn out by an optical cable to the outside of the branch device 13 in such a way as to be connected to optical fiber pairs of a submarine optical cable for additional installation, and an end thereof is accommodated in a casing for connection. Inside the casing for connection, each optical fiber is subjected to an end terminating process in such a way as to prevent reflection at an end surface, and the end is opened.

The branch device 14 is also similar thereto.

Figure 7:
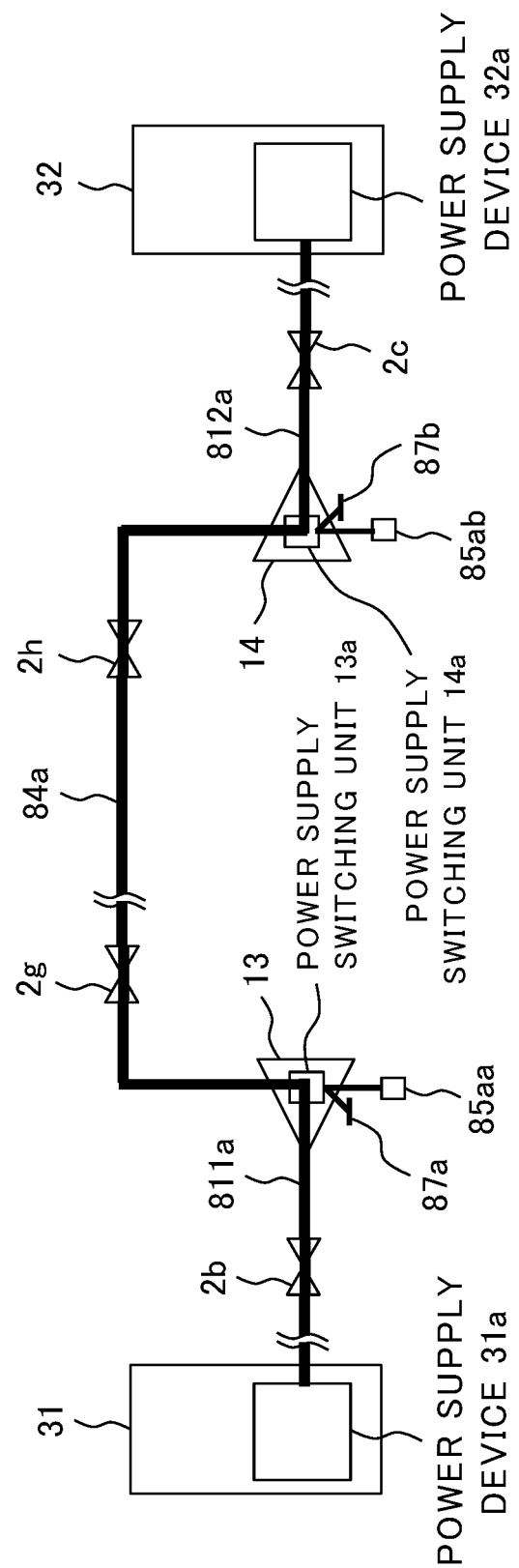
FIG. 7 is a conceptual diagram illustrating a configuration example of a section relating to power supply in the submarine optical cable system according to the present example embodiment.

FIG. 7 is a conceptual diagram illustrating a section relating to power supply in the submarine optical cable system 50 in FIG. 4. The land stations 31 and 32 include power supply devices 31a and 32a. Power supply wires 811a and 84a are power supply wires included in the submarine optical cables 811 and 84 in FIG. 4. The power supply wires are power wires (lead wires) for supplying power from the power supply devices 31a and 32a to the branch devices and the relay amplification devices. The branch devices 13 and 14 include power supply switching units 13a and 14a.

The power supply switching unit 13a connects the power supply wire 811a to the power supply wire 84a. Note that, when the additional installation scheduled section 91 in FIG. 4 is additionally installed, the power supply switching unit 13a follows the power supply switching information contained in the control information transmitted from the land station 31 or 32. In other words, the power supply switching unit 13a follows the power supply switching information, and a power supply wire included in a submarine optical cable in an additionally installed section in actuality, which is associated with the additional installation scheduled section 91, is switched to the connection destination of the power supply wire 811a. For example, the land station 31 or 32 transmits the power supply switching information to the branch device 13 via any one of the optical fiber pairs connected to the branch device 13. A method of transmitting the power supply switching information is similar to the above-mentioned method of transmitting the optical connection switching information that is transmitted for switching the optical switch pairs. For example, the reception unit 13c in FIG. 6 may receive the power supply switching information, and the control unit 13b may switch the power supply switching unit 13a in FIG. 7, based on the power supply switching information.

The power supply switching unit 14a is also similar to the power supply switching unit 13a.

In the submarine optical cable system 50 in FIG. 7, a power supply terminal 85aa that is not connected to any one of the power supply wires 811a and 84a is accommodated in the above-mentioned casing for connection in the outside of the branch device 13, and is protected in such a way as to be connected to a power supply wire of the submarine optical cable for additional installation when additional installation is performed afterward. The power supply terminal 85aa is grounded by connecting, in the branch device 13, the power supply wire connected to the power supply terminal 85aa to a ground 87a. For example, the ground 87a is a sea ground.

The branch device 14 is also similar thereto.

There are mainly following two ways of performing additional installation in the additional installation scheduled section 91 in FIG. 4. In one method, the additional installation scheduled section 91 is configured similarly to a configuration including the submarine optical cable 84 and relay amplification devices 2g and 2h, and is redundantly configured. In another method, a configuration that enables optical communication with another land station is additionally installed in the additional installation scheduled section 91.

Figure 8:
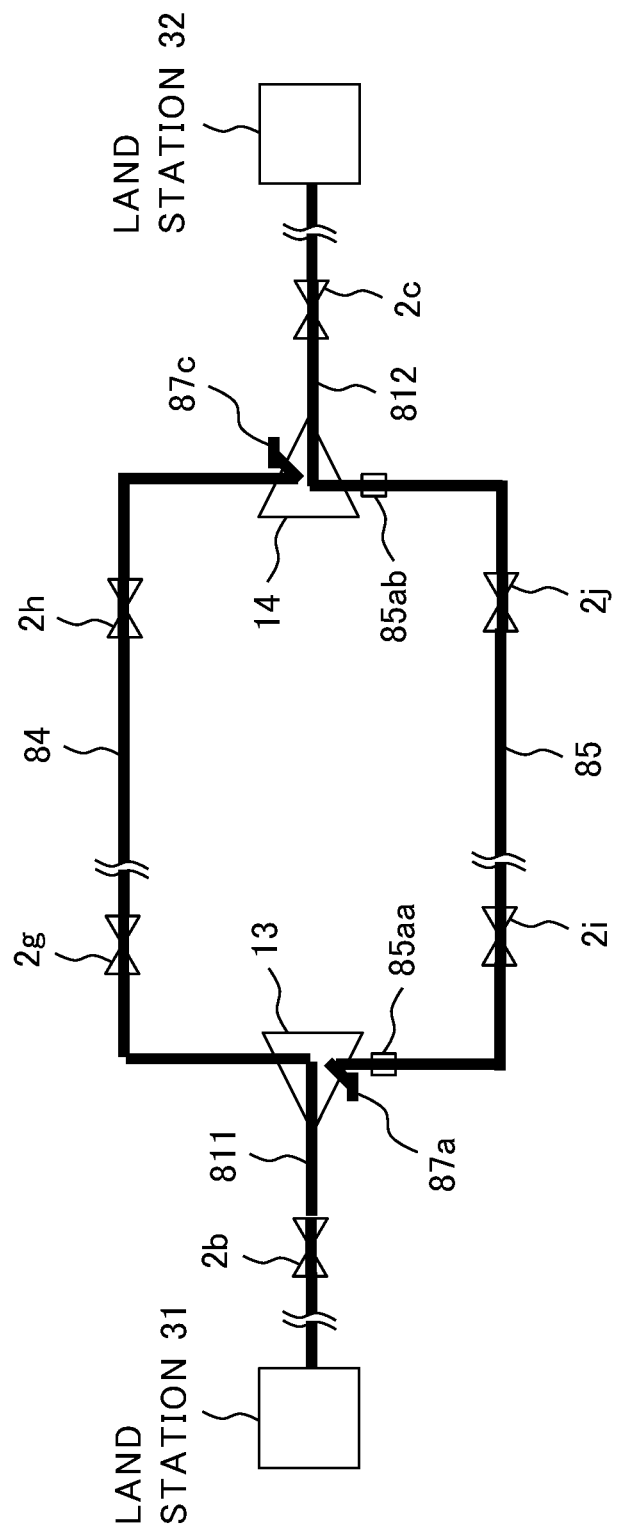
FIG. 8 is a conceptual diagram illustrating a configuration example of the submarine optical cable system that is redundantly configured by additionally installing an additional installation scheduled section.

First, explanation is made on a case of a redundancy configuration. FIG. 8 is a conceptual diagram illustrating the submarine optical cable system 50 that is redundantly configured by additionally installing the additional installation scheduled section 91 in FIG. 4.

The branch device 13 in FIG. 8 is capable of distributing the optical signals that are transmitted from the land station 31 via the optical fiber pairs of the submarine optical cable 811, to the optical fiber pairs included in the submarine optical cable 84 and optical fiber pairs included in a submarine optical cable 85. The branch device 13 is also capable of distributing the optical signals that are transmitted via the optical fiber pairs of the submarine optical cable 811, to any one of the optical fiber pairs included in the submarine optical cable 84 and optical fiber pairs included in the submarine optical cable 85.

The branch device 13 is further capable of causing the optical signals that are transmitted from the land station 32 via the optical fiber pairs of the submarine optical cables 84 and 85, to enter the optical fiber pairs included in the submarine optical cable 811.

In the state of FIG. 8, the branch device 13 connects the power supply wire included in the submarine optical cable 811 to the power supply wire included in the submarine optical cable 84. A right end of the power supply wire included in the submarine optical cable 84 is connected to a ground 87c by the branch device 14. With this, an electric current flows from the power supply device included in the land station 31 to the ground 87c, and power is supplied to the submarine optical cables 811 and 84.

In the state of FIG. 8, the branch device 14 connects the power supply wire included in the submarine optical cable 812 on the left, to a power supply wire included in the submarine optical cable 85. The left end of the power supply wire included in the submarine optical cable 85 is connected to the ground 87a by the branch device 13. With this, an electric current flows from the power supply device included in the land station 32 to the ground 87c, and power is supplied to the submarine optical cables 812 and 85.

The branch device 13 is capable of switching the connection destination of the power supply wire included in the submarine optical cable 811 from the state of FIG. 8 to the power supply wire included in the submarine optical cable 85. Further, the branch device 14 is capable of switching the connection destination of the power supply wire included in the submarine optical cable 812 from the state of FIG. 8 to the power supply wire included in the submarine optical cable 84. In this manner, the submarine optical cable system in FIG. 8 is redundantly configured in a section between the branch device 13 and the branch device 14.

Figure 9:
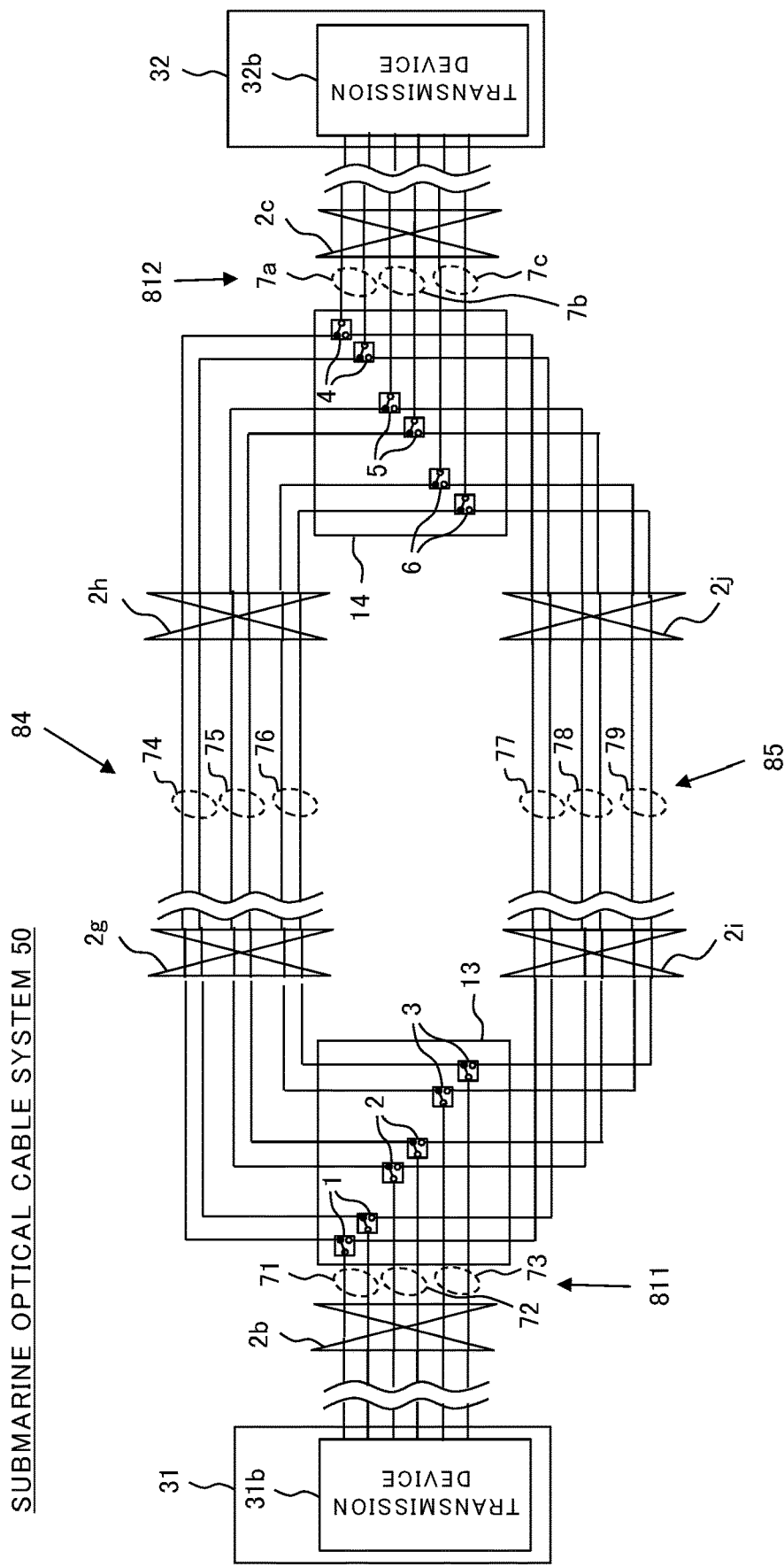
FIG. 9 is a conceptual diagram illustrating a configuration example of a section relating to optical transmission in the submarine optical cable system that is redundantly configured by additionally installing the additional installation scheduled section.
Figure 10:
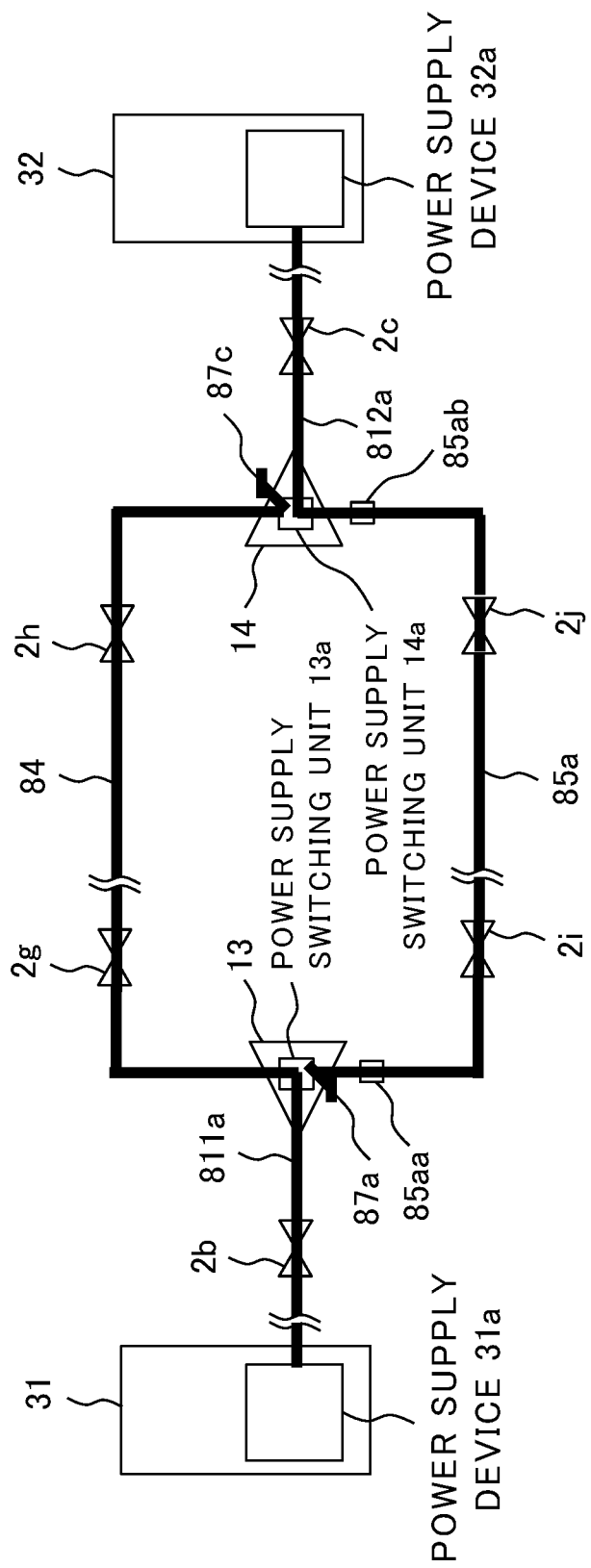
FIG. 10 is a conceptual diagram illustrating a configuration example of a section relating to power supply in the submarine optical cable system that is redundantly configured by additionally installing the additional installation scheduled section.

FIG. 9 is a conceptual diagram illustrating a configuration example of a section relating to optical transmission in the submarine optical cable system 50 in FIG. 8. Further, FIG. 10 is a conceptual diagram illustrating a power supply system in the submarine optical cable system 50 in FIG. 8. It is assumed that the contents of those drawings can be analogized and understood from the explanation given above, and hence explanation therefor is omitted while avoiding complexity.

Figure 11:
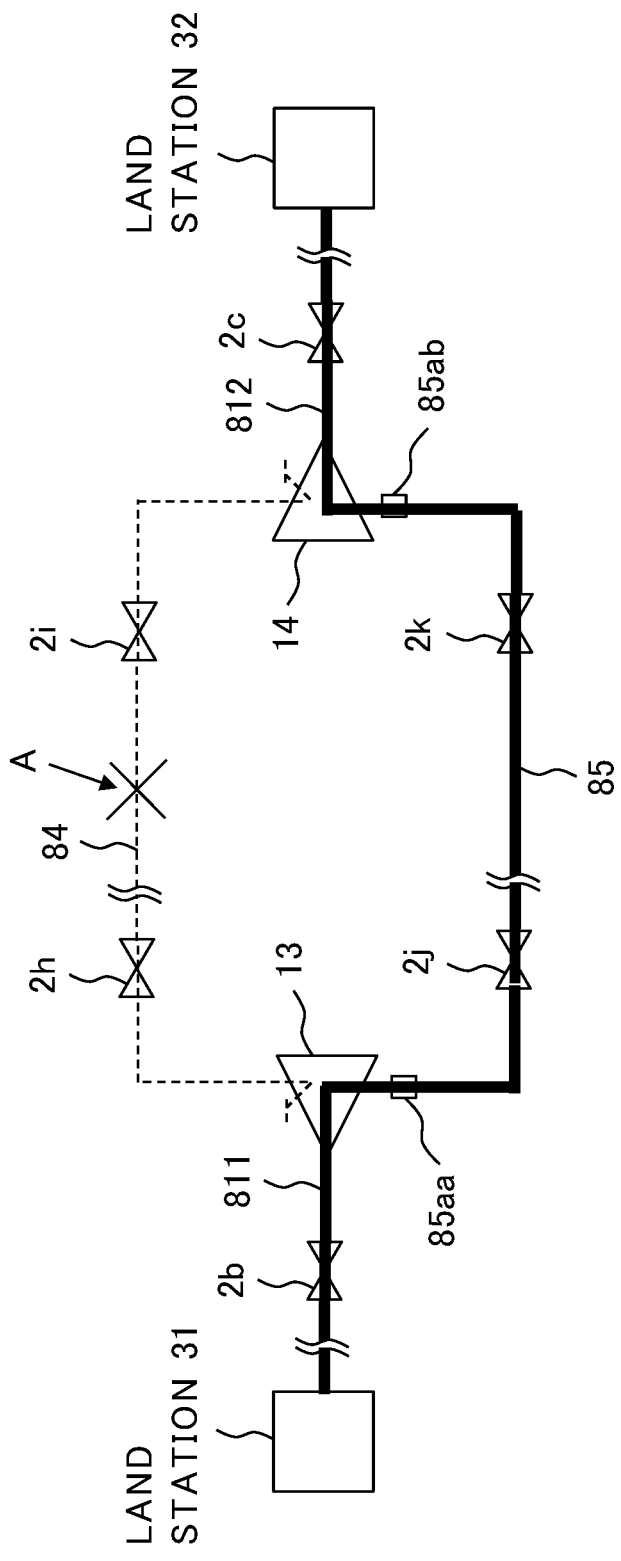
FIG. 11 is a conceptual diagram illustrating a state in which a failure occurs in the submarine optical cable system that is redundantly configured by additionally installing the additional installation scheduled section.

FIG. 11 is a conceptual diagram illustrating a state in which a failure occurs in the submarine optical cable system 50 in FIG. 8. In the submarine optical cable system 50 in FIG. 11, the branch device 13 connects the optical fiber pairs of the submarine optical cable 811 to optical fiber pairs of the submarine optical cable 85. Further, the branch device 13 connects the power supply wire of the submarine optical cable 811 to the power supply wire of the submarine optical cable 85. Further, the branch device 14 connects the optical fiber pairs of the submarine optical cable 812 to the optical fiber pairs of the submarine optical cable 85. Further, the branch device 14 connects the power supply wire of the submarine optical cable 812 to the power supply wire of the submarine optical cable 85.

As described above, even when a failure occurs at a position A of the submarine optical cable 84, the land stations 31 and 32 are capable of establishing optical communication with each other by using the submarine optical cable 85.

Next, explanation is made on a case in which a configuration enabling optical communication with another land station is additionally installed in the additional installation scheduled section 91 in FIG. 4.

Figure 12:
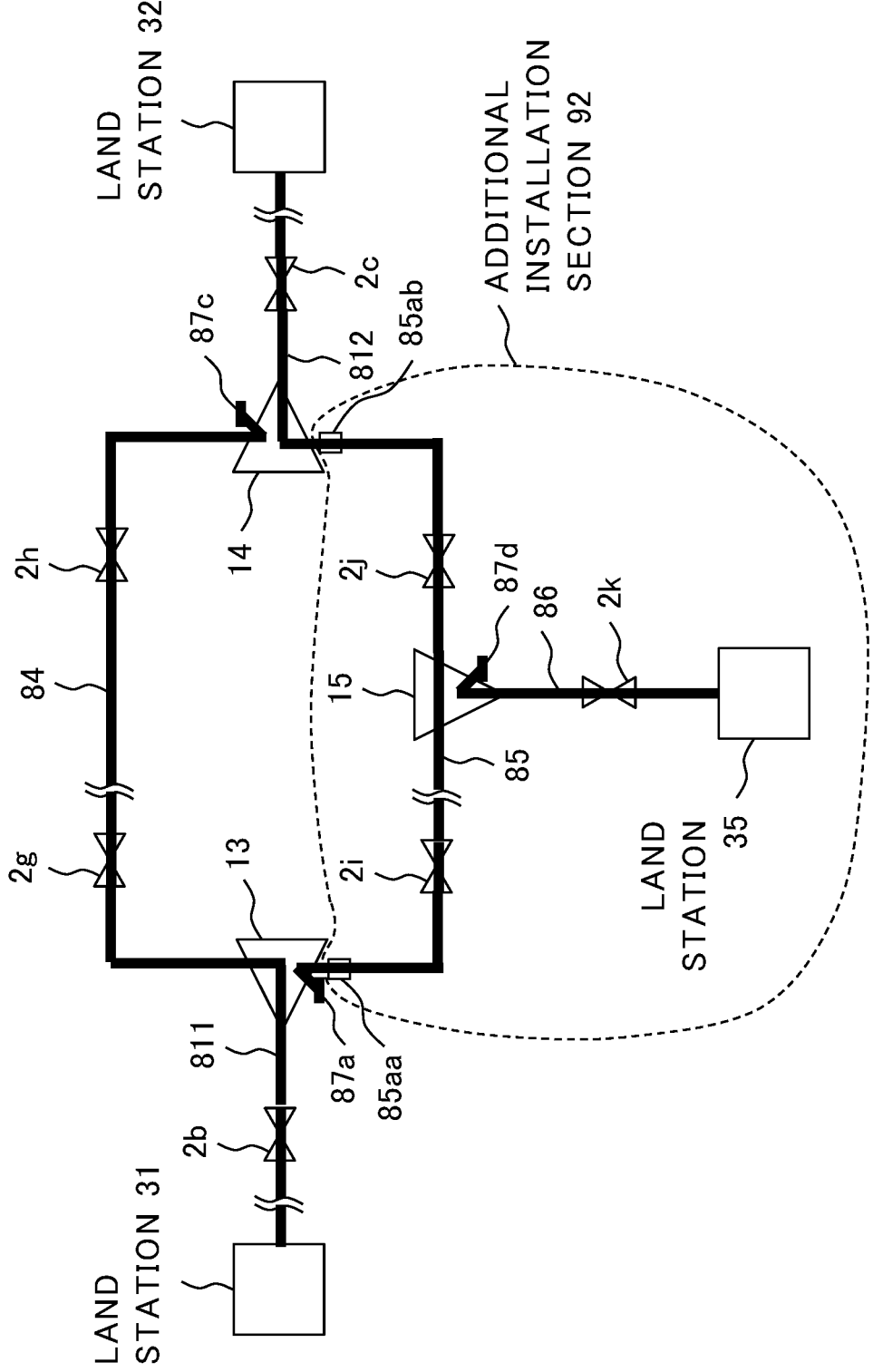
FIG. 12 is a conceptual diagram illustrating a configuration example of the submarine optical cable system in which a configuration for establishing optical communication with another land station is additionally installed in the additional installation scheduled section.

FIG. 12 is a conceptual diagram illustrating the submarine optical cable system 50 in which the configuration for establishing connection with another land station is additionally installed in the additional installation scheduled section 91 in FIG. 4. An additional installation section 92 being a section that is additionally installed includes submarine optical cables 85 and 86, a branch device 15, relay amplification devices 2i to 2k, and the land station 35.

The branch device 15 connects some or all of the optical fiber pairs included in the submarine optical cable 85 to the optical fiber pairs included in the submarine optical cable 86. The branch device 15 includes an optical switch for switching the connection. The optical switch follows the optical connection switching information that is transmitted from any one of the land stations 31, 32, and 35, and performs switching of the connection of the optical fiber pairs between the submarine optical cables. For example, the above-mentioned method of transmitting the control information from the land station 31 to the branch device 13 is applicable to the method of transmitting the optical connection switching information from the land station 31, 32, or 35.

The branch device 15 further includes a connection switching unit (electrical switch). The connection switching unit switches connection destinations of a power supply wire included in the submarine optical cable 86, based on the above-mentioned control information.

With the configuration described above, the submarine optical cable system 50 in FIG. 12 is capable of establishing optical communication of the land station 35 with both or one of the land stations 31 and 32.

Figure 13:
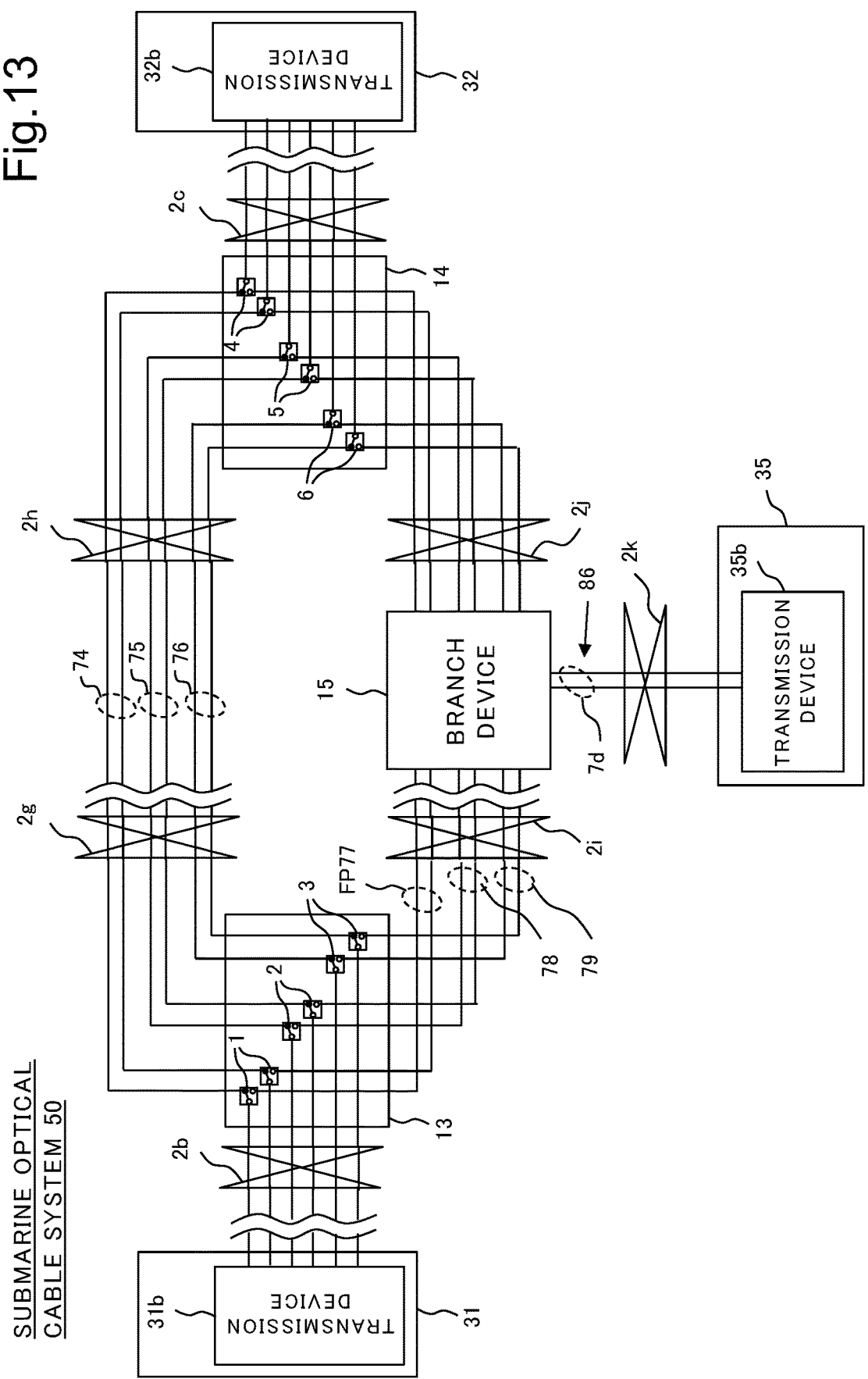
FIG. 13 is a conceptual diagram illustrating a configuration example of a section relating to optical transmission in the submarine optical cable system in which a configuration for establishing optical communication with another land station is additionally installed in the additional installation scheduled section.

FIG. 13 is conceptual diagram illustrating a section relating to transmission of an optical signal in the submarine optical cable system 50 in FIG. 12. In FIG. 13, the branch device 15 connects any one pair of the optical fiber pairs 77 to 79 to the optical fiber pairs 7d included in the submarine optical cable 86 that is connected to a transmission device 35b included in the land station 35. With this, the transmission device 35b enables optical communication with one or both of the transmission devices 31b and 32b.

The branch device 15 connects any freely selected one of the optical fiber pairs 77 to 79 to the optical fiber pair 7d. Further, an internal configuration of the branch device 15 for establishing the connection is freely selected. Moreover, the branch device 15 may be configured in such a manner that the submarine optical cable 86 includes optical fiber pairs other than the optical fiber pair 7d and that each of them is connected to any one of the optical fiber pairs 77 to 79.

Figure 14:
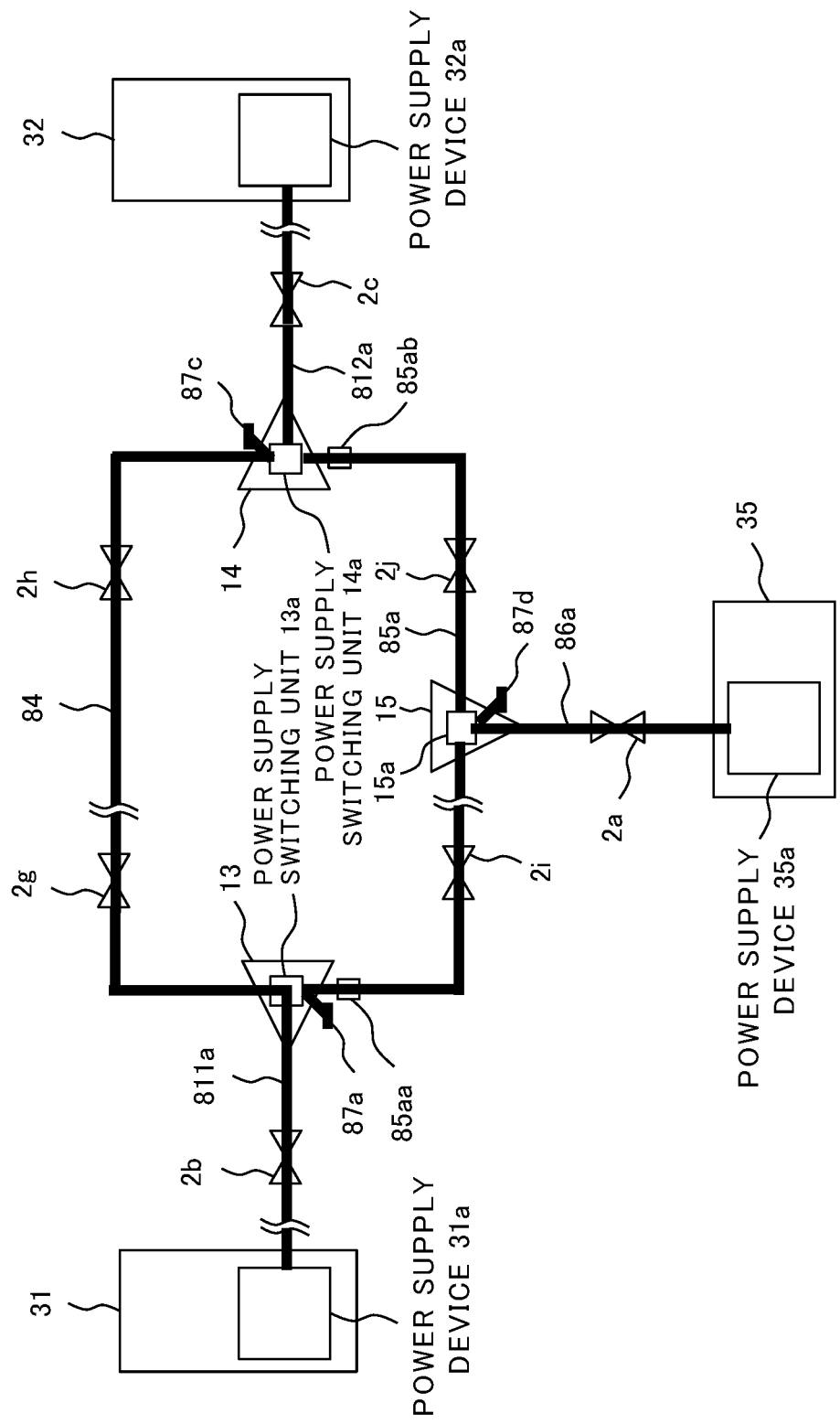
FIG. 14 is a conceptual diagram illustrating a configuration example of a section relating to power supply in the submarine optical cable system in which a configuration for establishing optical communication with another land station is additionally installed in the additional installation scheduled section.

FIG. 14 is a conceptual diagram illustrating a section relating to power supply in the submarine optical cable system 50 in FIG. 12. In FIG. 14, a power supply switching unit 15a included in the branch device 15 connects a power supply wire 85a supplied with power from a power supply device 35a included in the land station 35, to a power supply wire 86a included in the submarine optical cable 86 in FIG. 12.

Note that there may be adopted a configuration in which the power supply wire 86a is not connected to the power supply wire 85a. In such a case, the power supply switching unit 15a may be omitted.

As understood from the explanation given above, the configurations of the branch device 15, the submarine optical cable 86, and the land station 35 are highly flexible. The submarine optical cable system 50 in FIG. 4 enables such additional installation in a highly flexible manner without interrupting large-capacity optical communication between the land station 31 and the land station 32.

In this manner, in the submarine optical cable system 50 before additional installation, which is illustrated in FIG. 4, with regard to the configuration of the additional installation scheduled section 91, a high degree of flexibility in design is secured, as compared to the general submarine optical cable system 50 illustrated in FIG. 3. FIG. 3A.

[Effects]

The submarine optical cable system according to the present example embodiment enables additional installation that provides a communication path between the two branch devices with a redundancy configuration. Thus, even when a failure occurs in one communication path, communication can be established by using another communication path by, first, performing additional installation that provides the redundancy configuration between those branch devices.

Effects

The submarine optical cable system according to the present example embodiment enables additional installation that provides a communication path between the two branch devices with a redundancy configuration. Thus, even when a failure occurs in one communication path, communication can be established by using another communication path by, first, performing additional installation that provides the redundancy configuration between those branch devices.

Moreover, when additional installation is performed for establishing optical communication with another land station in the section between those branch devices, the submarine optical cable system enables additional installation of a configuration for establishing optical communication with another land station in another communication path while maintaining optical communication between the existing land stations in the one communication path. Thus, the submarine optical cable system enables a higher degree of flexibility of configurations to be additionally installed in order to establish optical communication with another land station.

Figure 15:
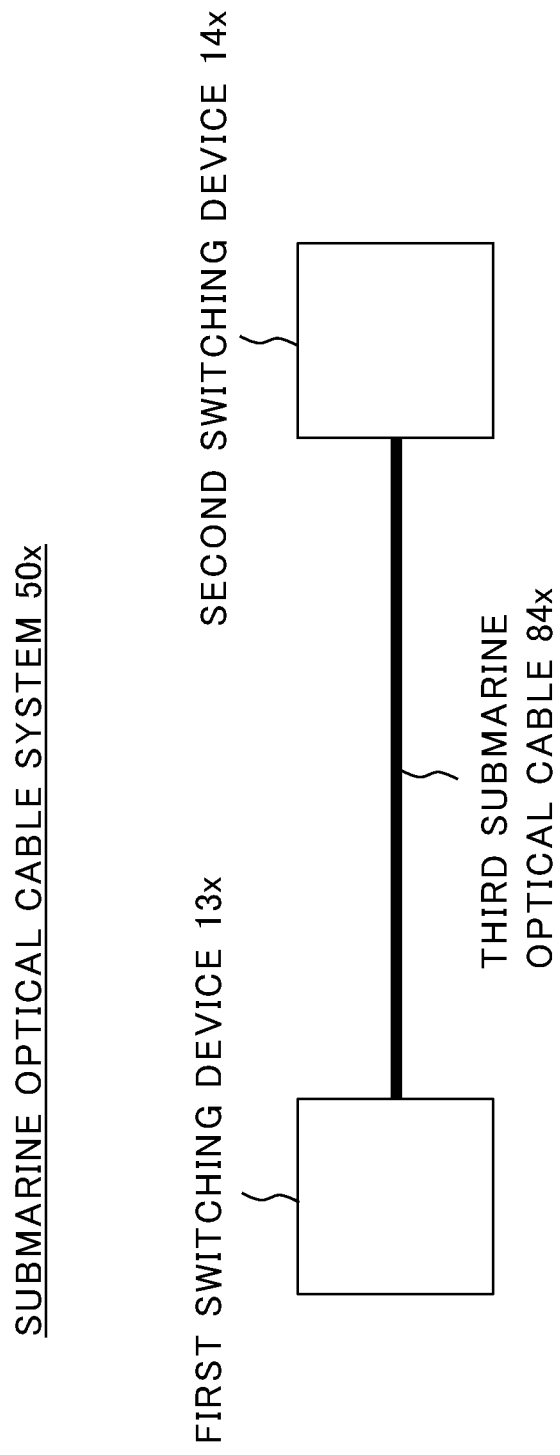
FIG. 15 is a conceptual diagram illustrating a minimum configuration of a submarine optical cable system according to an example embodiment.

FIG. 15 is a conceptual diagram illustrating a configuration of a submarine optical cable system 50x being a minimum configuration of a submarine optical cable system according to an example embodiment. The submarine optical cable system 50x includes a first switching device 13x, a second switching device 14x, and a third submarine optical cable 84x. The first switching device 13x is connected to a first land station via a first submarine optical cable. The second switching device 14x is connected to a second land station via a second submarine optical cable. The third submarine optical cable 84x is connected to the first switching device 13x and the second switching device 14x.

The first switching device 13x includes a first optical fiber core connecting unit to which an optical fiber core of a submarine optical cable associated with the third submarine optical cable 84x is allowed to be connected. The first switching device 13x further includes a first optical switch group that switches a connection destination of an optical fiber core included in the first submarine optical cable, to any one of an optical fiber core included in the third submarine optical cable 84x and the first optical fiber core connecting unit, based on first optical connection switching information being transmitted.

The second switching device 14x includes a second optical fiber core connecting unit to which an optical fiber core of a submarine optical cable associated with the third submarine optical cable 84x is allowed to be connected. The second switching device 14x further includes a second optical switch group that switches a connection destination of an optical fiber core included in the second submarine optical cable, based on second optical connection switching information being transmitted. The second switch group switches the connection destination to any one of an optical fiber core included in the third submarine optical cable 84x and the second optical fiber core connecting unit.

With the configuration described above, the submarine optical cable system 50x enables additional installation in such a way that the communication path between the first switching device 13x and the second switching device 14x is redundantly configured. With the configuration described above, the submarine optical cable system 50x further enables additional installation in such a way that optical communication is established between another land station and at least one of the first land station and the second land station while maintaining optical communication between the first land station and the second land station. Moreover, the submarine optical cable system 50x enables additional installation without interrupting optical communication between the first land station and the second land station, and therefore, is able to secure the degree of flexibility of configurations to be additionally installed in such a way as to establish optical communication with another land station.

As described above, the submarine optical cable system 50x improves the degree of flexibility of configurations to be additionally installed. Thus, the submarine optical cable system 50x exerts the effects described in the section [Advantageous Effects of Invention] with the configuration mentioned above.

The above has been an explanation made on the example embodiments of the present invention, but the present invention is not limited to the above-mentioned example embodiments, and further modifications, replacement, and adjustment can be added without departing from the basic technical idea of the present invention. For example, the configurations of the elements illustrated in the drawings are merely examples for easy understanding of the present invention, and are not limited to the configurations illustrated in the drawings.

The whole or part of the example embodiments disclosed above can be described as, but not limited to, the following supplementary notes.

(Supplementary Note 1)

A submarine optical cable system including:
  a first switching device being connected to a first land station via a first submarine optical cable;
  a second switching device being connected to a second land station via a second submarine optical cable; and
  a third submarine optical cable being connected to the first switching device and the second switching device,
  wherein
  the first switching device includes:
    a first optical fiber core connecting unit to which an optical fiber core of a submarine optical cable equivalent to the third submarine optical cable is allowed to be connected; and
    a first optical switch group that switches a connection destination of an optical fiber core included in the first submarine optical cable to any one of an optical fiber core included in the third submarine optical cable and the first optical fiber core connecting unit, based on first optical connection switching information being transmitted, and
  the second switching device includes:
    a second optical fiber core connecting unit to which an optical fiber core of a submarine optical cable equivalent to the third submarine optical cable is allowed to be connected; and
    a second optical switch group that switches a connection destination of an optical fiber core included in the second submarine optical cable to any one of an optical fiber core included in the third submarine optical cable and the second optical fiber core connecting unit, based on second optical connection switching information being transmitted.

(Supplementary Note 2)

The submarine optical cable system according to supplementary note 1, wherein
  the first optical fiber core connecting unit is present inside a casing of the first switching device, and the second optical fiber core connecting unit is present inside a casing of the second switching device.

(Supplementary Note 3)

The submarine optical cable system according to supplementary note 1 or 2, wherein
  the first optical fiber core connecting unit and the second optical fiber core connecting unit are protected.

(Supplementary Note 4)

The submarine optical cable system according to any one of supplementary notes 1 to 3, wherein
  the first optical connection switching information and the second optical connection switching information are transmitted from any one of the first land station and the second land station.

(Supplementary Note 5)

The submarine optical cable system according to any one of supplementary notes 1 to 4, wherein the first optical connection switching information is transmitted via the first submarine optical cable or the third submarine optical cable, and the second optical connection switching information is transmitted via the second submarine optical cable or the third submarine optical cable.

(Supplementary Note 6)

The submarine optical cable system according to supplementary note 5, wherein the first optical connection switching information is transmitted via an optical fiber core included in the first submarine optical cable or the third submarine optical cable, and the second optical connection switching information is transmitted via an optical fiber core included in the second submarine optical cable or the third submarine optical cable.

(Supplementary Note 7)

The submarine optical cable system according to any one of supplementary notes 1 to 6, wherein the first switching device includes:
a first power supply wire connecting unit to which a power supply wire of a submarine optical cable equivalent to the third submarine optical cable is allowed to be connected; and
a first electrical switch that switches a connection destination of a power supply wire included in the first submarine optical cable to the first power supply wire connecting unit, based on first power supply switching information being transmitted from the first land station or the second land station, and the second switching device includes:
a second power supply wire connecting unit to which a power supply wire of a submarine optical cable equivalent to the third submarine optical cable is allowed to be connected; and
a second electrical switch that switches a connection destination of a power supply wire included in the second submarine optical cable to the second power supply wire connecting unit, based on second power supply switching information being transmitted from the first land station or the second land station.

(Supplementary Note 8)

The submarine optical cable system according to supplementary note 7, wherein the first power supply wire connecting unit is present inside a casing of the first switching device, and the second power supply wire connecting unit is present inside a casing of the second switching device.

(Supplementary Note 9)

The submarine optical cable system according to supplementary note 7 or 8, wherein the first power supply wire connecting unit and the second power supply wire connecting unit are protected.

(Supplementary Note 10)

The submarine optical cable system according to any one of supplementary notes 7 to 9, wherein the first power supply switching information and the second power supply switching information are transmitted from any one of the first land station and the second land station.

(Supplementary Note 11)

The submarine optical cable system according to any one of supplementary notes 7 to 10, wherein the first power supply switching information is transmitted via the first submarine optical cable or the third submarine optical cable, and the second power supply switching information is transmitted via the second submarine optical cable or the third submarine optical cable.

(Supplementary Note 12)

The submarine optical cable system according to supplementary note 11, wherein the first power supply switching information is transmitted via an optical fiber core included in the first submarine optical cable or the third submarine optical cable, and the second power supply switching information is transmitted via an optical fiber core included in the second submarine optical cable or the third submarine optical cable.

(Supplementary Note 13)

The submarine optical cable system according to any one of supplementary notes 1 to 12, further including at least one of the first submarine optical cable and the second submarine optical cable.

(Supplementary Note 14)

The submarine optical cable system according to any one of supplementary notes 1 to 13, further including at least one of the first land station and the second land station.

Herein, association examples between the terms in supplementary note given above and the terms used before supplementary notes are as given below. "The first land station" is associated with, for example, the land station 31 in FIG. 4, 5, or 7. Further, "the first submarine optical cable" is associated with, for example, the submarine optical cable 811 in FIG. 4 or 5. Further, "the first switching device" is associated with, for example, the branch device 13 in FIG. 4, 5, or 7 or the first switching device 13x in FIG. 15.

Further, "the second land station" is associated with, for example, the land station 32 in FIG. 4, 5, or 7. Further, "the second submarine optical cable" is associated with, for example, the submarine optical cable 812 in FIG. 4 or 5. Further, "the second switching device" is associated with, for example, the branch device 14 in FIG. 4, 5, or 7 or the second switching device 14x in FIG. 15.

Further, "the third submarine optical cable" is associated with, for example, the submarine optical cable 84 in FIG. 4 or 5 or the third submarine optical cable 84x in FIG. 15. Further, "the first optical fiber core connecting unit" is associated with, for example, the opened end of the optical fiber pair group 61 in FIG. 5 or 6. Further, "the first optical connection switching information" is associated with, for example, the connection switching information contained in the control information received by the reception unit 13c in FIG. 6.

Further, "the first optical switch group" is associated with, for example, the optical switch group including the optical switch pairs 1 to 3 in FIG. 6. Further, "the second optical fiber core connecting unit" is associated with, for example, the opened end of the optical fiber pair group 62 in FIG. 5. Further, "the second optical connection switching information" is associated with, for example, the connection switching information contained in the control information received by the reception unit, which is included in the "second switching device", associated with the reception unit 13c in FIG. 6.

Further, "the second optical switch group" is associated with, for example, the optical switch group including the optical switch pairs, which is included in "the second switching device", associated with the optical switch pairs 1 to 3 in FIG. 6. Further, "the submarine optical cable system" is associated with, for example, the submarine optical cable system 50 in FIG. 4, 5, or 7 or the submarine optical cable system 50x in FIG. 15.

Further, "the first power supply wire connecting unit" is associated with, for example, the power supply terminal 85aa in FIG. 7. Further, "the first power supply switching information" is associated with, for example, the power supply switching information contained in the control information received by the reception unit 13c in FIG. 6. Further, "the first electrical switch" is associated with, for example, the power supply switching unit 13a in FIG. 7. Further, "the second power supply wire connecting unit" is associated with, for example, a power supply terminal 85ab in FIG. 7. Further, "the second power supply switching information" is associated with, for example, the power supply switching information contained in the control information received by the reception unit, which is included in the branch device 14 in FIG. 7, associated with the reception unit 13c in FIG. 6. Further, "the second electrical switch" is associated with, for example, the power supply switching unit 14a in FIG. 7.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-141351, filed on Aug. 25, 2020, the disclosure of which is incorporated herein in its entirety by reference.

REFERENCE SIGNS LIST 1, 2, 3 Optical switch pair
11, 12, 13 Branch device
13a, 14a Power supply switching unit
13b Control unit
13c Reception unit
13x First switching device
14x Second switching device
2a, 2b, 2c, 2d, 2e, 2f, 2i, 2j, 2k Relay amplification device
31, 32, 33, 34, 35 Land station
31a, 32a, 35a Power supply device
31b, 32b, 35b Transmission device
50, 50x Submarine optical cable system
51 Coupler
61 Optical fiber pair group
71, 72, 72, 74, 75, 76, 77, 78, 79, 7a, 7b, 7c, 7d Optical fiber pair
91 Additional installation scheduled section
81, 811, 812, 82, 83, 84, 85 Submarine optical cable
84x Third submarine optical cable
81a, 85a Power supply wire
87a, 87b, 87c, 87d Ground

What is claimed is:

1. A submarine optical cable system comprising:
a first switch configured to be connected to a first land station via a first submarine optical cable;
a second switch configured to be connected to a second land station via a second submarine optical cable; and
a third submarine optical cable that connects the first switch and the second switch, wherein:
the first switch includes:
a first optical fiber core connector to which a first optical fiber core of a fourth submarine optical cable arrangeable, between the first switch and the second switch, in parallel to the third submarine optical cable is allowed to be connected; and
a first optical switch group that connects a second optical fiber core included in the first submarine optical cable, and any one of a third optical fiber core included in the third submarine optical cable and the first optical fiber core connector, based on first optical connection switching information being transmitted,
the second switch includes:
a second optical fiber core connector to which an optical fiber core of the fourth submarine optical cable is allowed to be connected; and
a second optical switch group that connects a fourth optical fiber core included in the second submarine optical cable, and any one of the third optical fiber core and the second optical fiber core connector, based on second optical connection switching information being transmitted,
the first switch includes:
a first power supply wire connector to which a first power supply wire of the fourth submarine optical cable is allowed to be connected; and
a first electrical switch that switches a connection destination of a second power supply wire included in the first submarine optical cable to the first power supply wire connector, based on first power supply switching information being transmitted from the first land station or the second land station, and
the second switch includes:
a second power supply wire connector to which the first power supply wire is allowed to be connected; and
a second electrical switch that switches a connection destination of a third power supply wire included in the second submarine optical cable to the second power supply wire connector, based on second power supply switching information being transmitted from the first land station or the second land station.

2. The submarine optical cable system according to claim 1, wherein the first optical fiber core connector is present inside a casing of the first switch, and the second optical fiber core connector is present inside a casing of the second switch.

3. The submarine optical cable system according to claim 2, wherein the first optical fiber core connector and the second optical fiber core connector are protected.

4. The submarine optical cable system according to claim 2, wherein the first optical connection switching information and the second optical connection switching information are transmitted from any one of the first land station and the second land station.

5. The submarine optical cable system according to claim 2, wherein:
the first optical connection switching information is transmitted via the first submarine optical cable or the third submarine optical cable, and
the second optical connection switching information is transmitted via the second submarine optical cable or the third submarine optical cable.

6. The submarine optical cable system according to claim 1, wherein the first optical fiber core connector and the second optical fiber core connector are protected.

7. The submarine optical cable system according to claim 6, wherein the first optical connection switching information and the second optical connection switching information are transmitted from any one of the first land station and the second land station.

8. The submarine optical cable system according to claim 6, wherein:
the first optical connection switching information is transmitted via the first submarine optical cable or the third submarine optical cable, and
the second optical connection switching information is transmitted via the second submarine optical cable or the third submarine optical cable.

9. The submarine optical cable system according to claim 1, wherein the first optical connection switching information and the second optical connection switching information are transmitted from any one of the first land station and the second land station.

10. The submarine optical cable system according to claim 9, wherein:
the first optical connection switching information is transmitted via the first submarine optical cable or the third submarine optical cable, and
the second optical connection switching information is transmitted via the second submarine optical cable or the third submarine optical cable.

11. The submarine optical cable system according to claim 1, wherein:
the first optical connection switching information is transmitted via the first submarine optical cable or the third submarine optical cable, and
the second optical connection switching information is transmitted via the second submarine optical cable or the third submarine optical cable.

12. The submarine optical cable system according to claim 11, wherein:
the first optical connection switching information is transmitted via an optical fiber core included in the first submarine optical cable or the third submarine optical cable, and
the second optical connection switching information is transmitted via an optical fiber core included in the second submarine optical cable or the third submarine optical cable.

13. The submarine optical cable system according to claim 1, wherein the first power supply wire connector is present inside a casing of the first switch, and the second power supply wire connector is present inside a casing of the second switch.

14. The submarine optical cable system according to claim 1, wherein the first power supply wire connector and the second power supply wire connector are protected.

15. The submarine optical cable system according to claim 1, wherein the first power supply switching information and the second power supply switching information are transmitted from any one of the first land station and the second land station.

16. The submarine optical cable system according to claim 1, wherein:
the first power supply switching information is transmitted via the first submarine optical cable or the third submarine optical cable, and
the second power supply switching information is transmitted via the second submarine optical cable or the third submarine optical cable.

17. The submarine optical cable system according to claim 16, wherein:
the first power supply switching information is transmitted via an optical fiber core included in the first submarine optical cable or the third submarine optical cable, and
the second power supply switching information is transmitted via an optical fiber core included in the second submarine optical cable or the third submarine optical cable.

18. The submarine optical cable system according to claim 1, further comprising at least one of the first submarine optical cable and the second submarine optical cable.

19. The submarine optical cable system according to claim 1, further comprising at least one of the first land station and the second land station.

* * * * *